United States Patent
Klingenbrunn et al.

(10) Patent No.: US 9,019,836 B2
(45) Date of Patent: Apr. 28, 2015

(54) DOWNLINK DATA TRANSFER FLOW CONTROL DURING CARRIER AGGREGATION

(71) Applicant: QUALCOMM Incorporated, San Diego, CA (US)

(72) Inventors: Thomas Klingenbrunn, San Diego, CA (US); Navid Ehsan, San Diego, CA (US); Aziz Gholmieh, Del Mar, CA (US); Amir Aminzadeh Gohari, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 13/745,447

(22) Filed: Jan. 18, 2013

(65) Prior Publication Data

US 2013/0201834 A1 Aug. 8, 2013

Related U.S. Application Data

(60) Provisional application No. 61/594,986, filed on Feb. 3, 2012.

(51) Int. Cl.
*H04L 12/26* (2006.01)
*H04W 28/12* (2009.01)
(Continued)

(52) U.S. Cl.
CPC .......... *H04W 28/12* (2013.01); *H04L 5/001* (2013.01); *H04L 5/0098* (2013.01); *H04W 28/0205* (2013.01); *H04W 8/24* (2013.01)

(58) Field of Classification Search
USPC ............................... 370/236, 237
See application file for complete search history.

(56) References Cited

U.S. PATENT DOCUMENTS 6,421,374 B2 * 7/2002 Blakeney et al. .............. 375/220
6,526,022 B1 * 2/2003 Chiu et al. .................... 370/229
(Continued)

FOREIGN PATENT DOCUMENTS

EP 2257113 A1 12/2010
EP 2398176 A1 12/2011
(Continued)

OTHER PUBLICATIONS

Huawei: "Timer based implicit deactivation for 4C-HSDPA". 3GPP Draft; R1-104114, 3rd Generation Partnership Project (3GPP), Mobile Competence Centre, vol. RAN WG1, Jun. 22, 2010, XP050449390, Sophia-Antipolis Cedex ; France [retrieved on Jun. 22, 2010].
(Continued)

*Primary Examiner* — Sai-Ming Chan
(74) *Attorney, Agent, or Firm* — Novak Druce Connolly Bove + Quigg LLP

(57) ABSTRACT

Techniques are provided for controlling downlink data transfer during carrier aggregation. For example, a method may control a secondary component carrier downlink (DL) in a wireless communication network using carrier aggregation. The method may include detecting, by a mobile entity, an event indicating a resource constraint at the mobile entity related to a data transmission from a base station to the mobile entity on a secondary component carrier of a carrier aggregation enabled connection. The method may include, in response to detecting the event, controlling the data transmission by signaling a status of the secondary component carrier DL to the base station.

36 Claims, 15 Drawing Sheets

(51) Int. Cl.
*H04L 5/00* (2006.01)
*H04W 28/02* (2009.01)
*H04W 8/24* (2009.01)

(56) References Cited

U.S. PATENT DOCUMENTS

| | | | |
|---|---|---|---|
| 2005/0075103 A1* | 4/2005 | Hikokubo et al. | 455/423 |
| 2009/0257387 A1 | 10/2009 | Gholmieh et al. | |
| 2010/0322090 A1 | 12/2010 | Zhang et al. | |
| 2011/0021154 A1 | 1/2011 | Marinier et al. | |
| 2011/0026475 A1 | 2/2011 | Lee et al. | |
| 2011/0028148 A1 | 2/2011 | Lee et al. | |
| 2011/0081936 A1 | 4/2011 | Haim et al. | |
| 2011/0143749 A1* | 6/2011 | Guo et al. | 455/424 |
| 2011/0170420 A1* | 7/2011 | Xi et al. | 370/241 |

FOREIGN PATENT DOCUMENTS

| | | |
|---|---|---|
| EP | 2398285 A1 | 12/2011 |
| WO | 2010101510 A2 | 9/2010 |
| WO | 2011008002 A2 | 1/2011 |
| WO | 2011135163 A1 | 11/2011 |

OTHER PUBLICATIONS

Partial International Search Report—PCT/US2013/022510—ISA/EPO—May 14, 2013.
International Search Report and Written Opinion—PCT/US2013/022510—ISA/EPO—Jul. 23, 2013.
Lucent A et al., "UE Autonomous Secondary Carrier Deactivation in 4C-HSDPA", 3GPP Draft; R1-104067, 3rd Generation Partnership Project (3GPP), Mobile Competence Centre, vol. RAN WG1, Jun. 23, 2010, XP050449482.

* cited by examiner

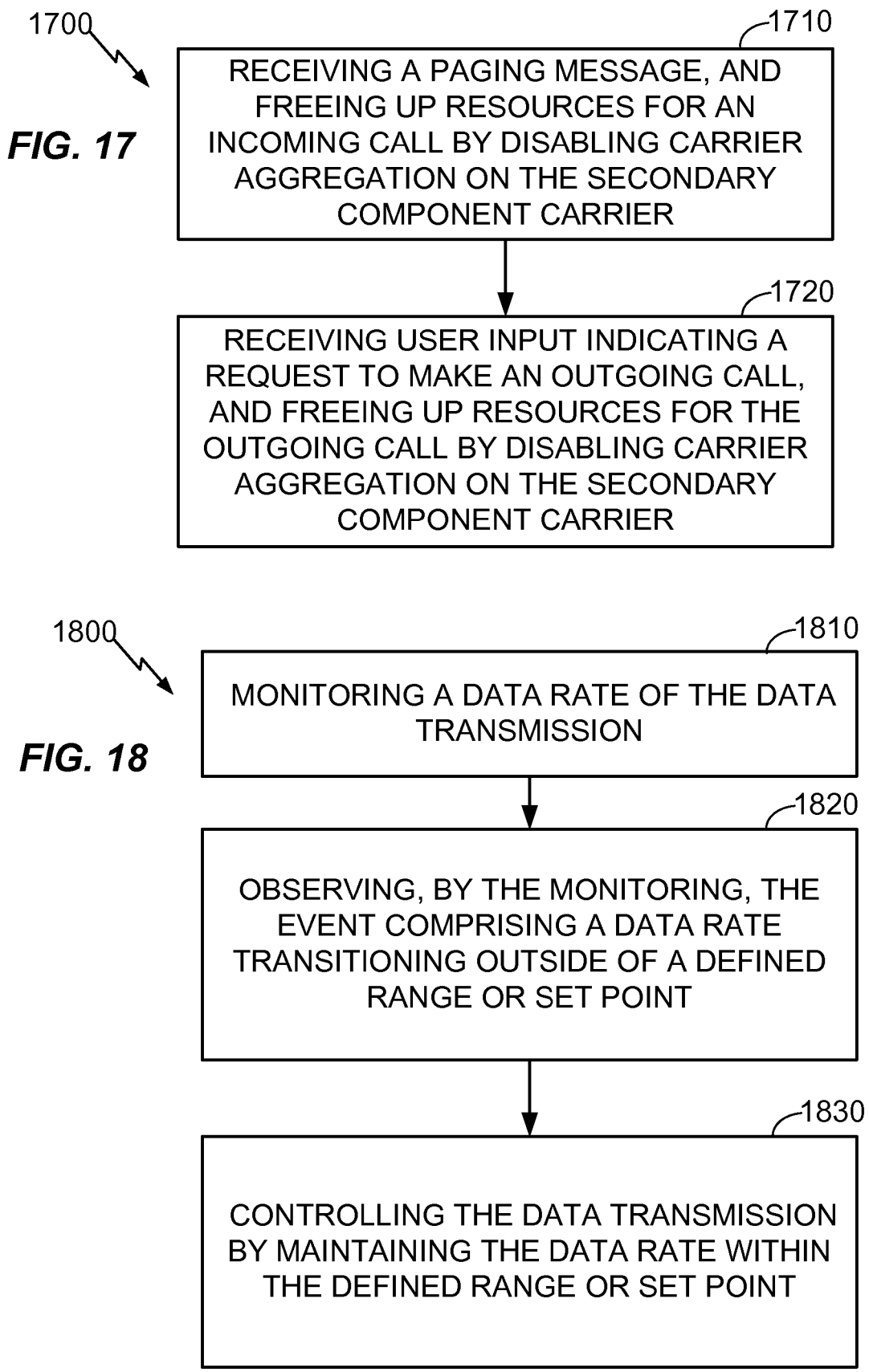

DOWNLINK DATA TRANSFER FLOW CONTROL DURING CARRIER AGGREGATION

CROSS-REFERENCE TO RELATED APPLICATION

The present Application for Patent claims priority to Provisional Application No. 61/594,986, filed Feb. 3, 2012, entitled "DOWNLINK DATA TRANSFER FLOW CONTROL DURING CARRIER AGGREGATION", which is assigned to the assignee hereof, and is hereby expressly incorporated in its entirety by reference herein.

BACKGROUND

1. Field

Aspects of the present disclosure relate generally to wireless communication systems, and more particularly, to providing downlink data transfer flow control during carrier aggregation.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. As used herein, a "carrier" refers to a radio band centered on a defined frequency and used for wireless communications.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed is an apparatus and method for downlink data transfer flow control during carrier aggregation. According to one aspect, a method is disclosed for controlling a secondary component carrier downlink (DL) in a wireless communication network using carrier aggregation. The method includes detecting, by a mobile entity, an event indicating a resource constraint at the mobile entity related to a data transmission from a base station to the mobile entity on a secondary component carrier of a carrier aggregation enabled connection. The method includes, in response to detecting the event, controlling the data transmission by signaling a status of the secondary component carrier DL to the base station.

According to another aspect, an apparatus is disclosed for controlling a secondary component carrier downlink (DL) in a wireless communication network using carrier aggregation. The apparatus includes means for detecting an event indicating a resource constraint at a mobile entity related to a data transmission from a base station to the mobile entity on a secondary component carrier of a carrier aggregation enabled connection. The apparatus includes means for controlling the data transmission by signaling a status of the secondary component carrier DL to the base station in response to detecting the event.

According to another aspect, an apparatus is disclosed for controlling a secondary component carrier downlink (DL) in a wireless communication network using carrier aggregation. The apparatus includes at least one processor configured for detecting an event indicating a resource constraint at a mobile entity related to a data transmission from a base station to the mobile entity on a secondary component carrier of a carrier aggregation enabled connection, and controlling the data transmission by signaling a status of the secondary component carrier DL to the base station in response to detecting the event. The apparatus includes a memory coupled to the at least one processor for storing data.

According to another aspect, a computer program product is disclosed for controlling a secondary component carrier downlink (DL) in a wireless communication network using carrier aggregation. The computer program product includes a non-transitory computer-readable medium holding encoded instructions, that when executed by a processor, cause a mobile communications device to detect an event indicating a resource constraint at a mobile entity related to a data transmission from a base station to the mobile entity on a secondary component carrier of a carrier aggregation enabled connection, and to control the data transmission by signaling a status of the secondary component carrier DL to the base station in response to detecting the event.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIGS. 12-18 illustrate embodiments of a methodology for downlink data transfer flow control during carrier aggregation, without requiring use of a new MAC control element, performed at a mobile entity.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
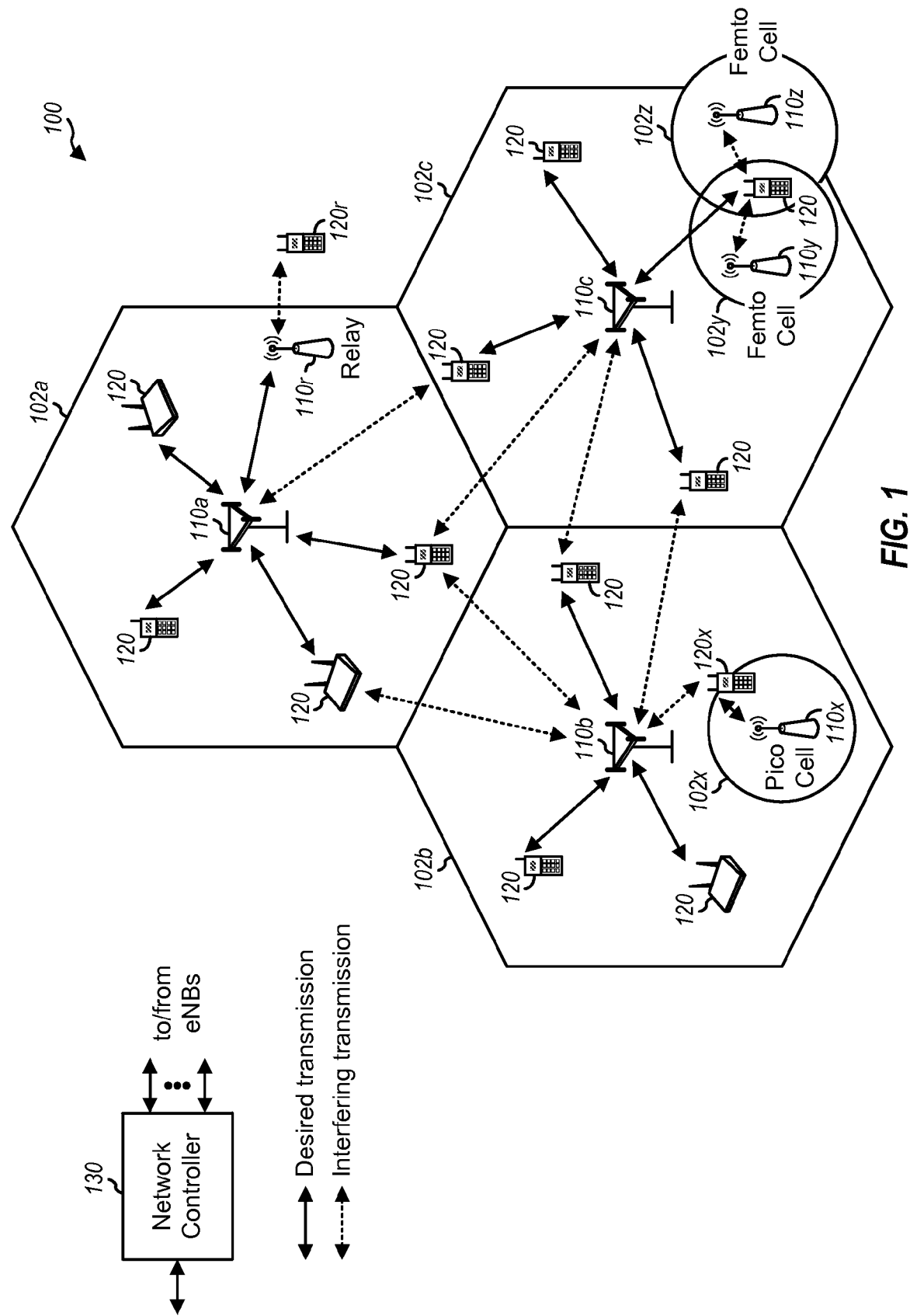
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE (e.g., UE 120x) that relays transmissions for other UEs or eNBs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a smartphone, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
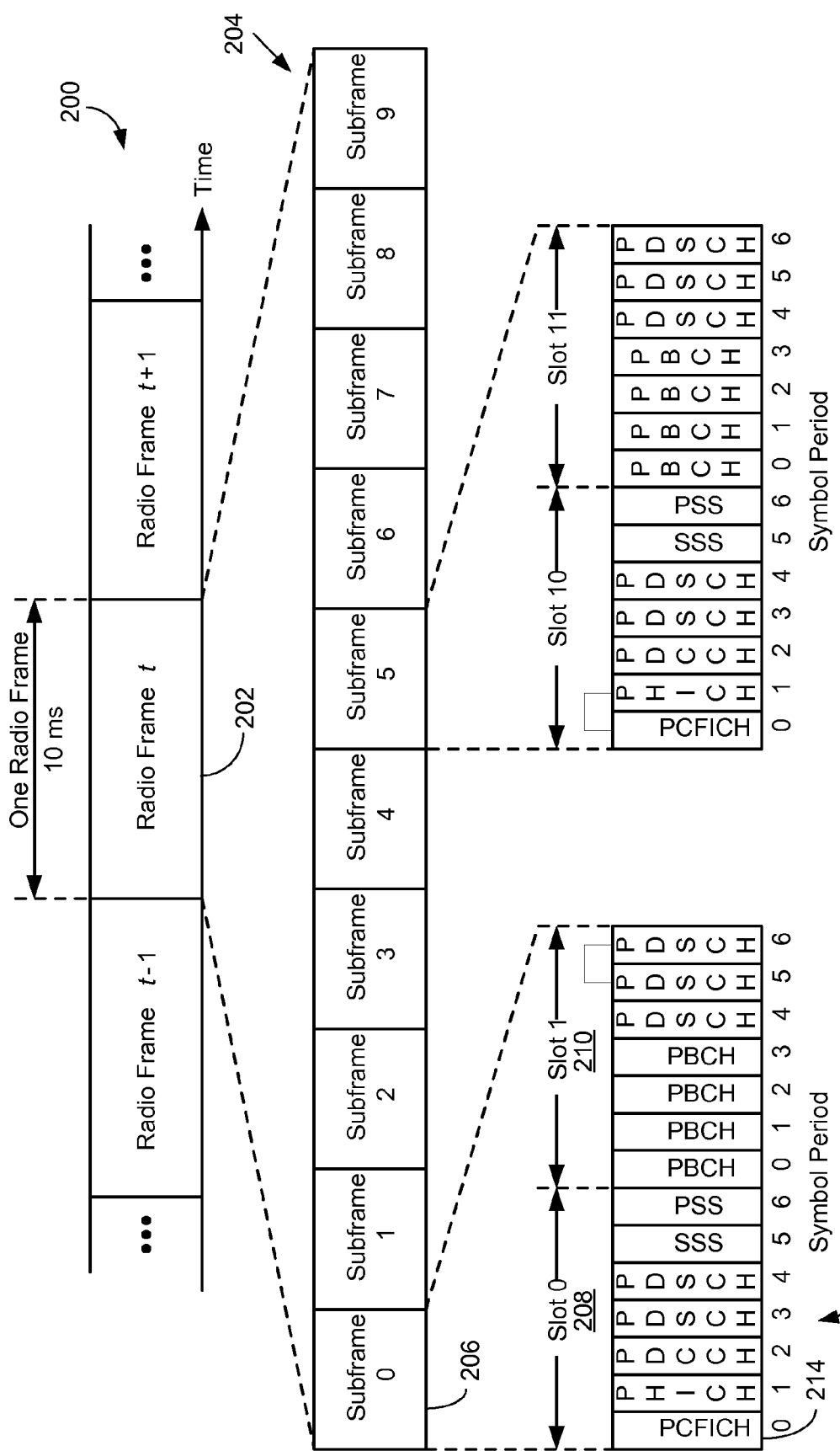
FIG. 2 is a block diagram conceptually illustrating an example of a down link frame structure in a telecommunications system.
Figure 6:
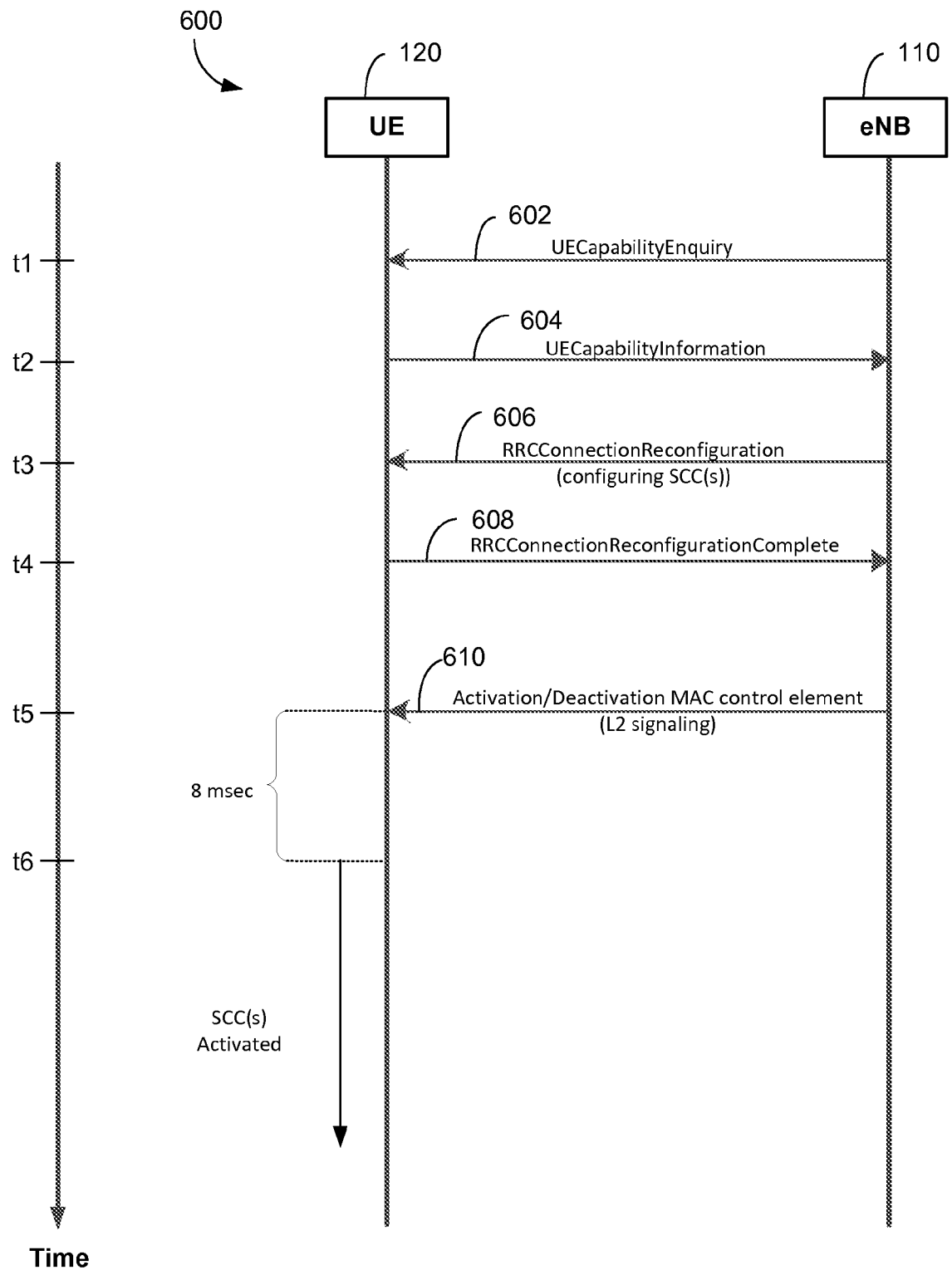
FIG. 6 is a sequence diagram illustrating an example of a call flow for negotiating carrier aggregation capabilities of a UE during initial attach to a cell.

FIG. 2 shows a down link frame structure used in LTE. The transmission timeline for the downlink may be partitioned into units of radio frames 200. Each radio frame, for example, frame 202, may have a predetermined duration (e.g., 10 milliseconds (ms)) and may be partitioned into 10 subframes 204 with indices of 0 through 9. Each subframe, for example 'Subframe 0' 206, may include two slots, for example, 'Slot 0' 208 and 'Slot 1' 210. Each radio frame may thus include 20 slots with indices of 0 through 19. Each slot may include 'L' symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2 L symbol periods in each subframe may be assigned indices of 0 through 2 L-1. The available time frequency resources may be partitioned into resource blocks. Each resource block may cover 'N' subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period 214 in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
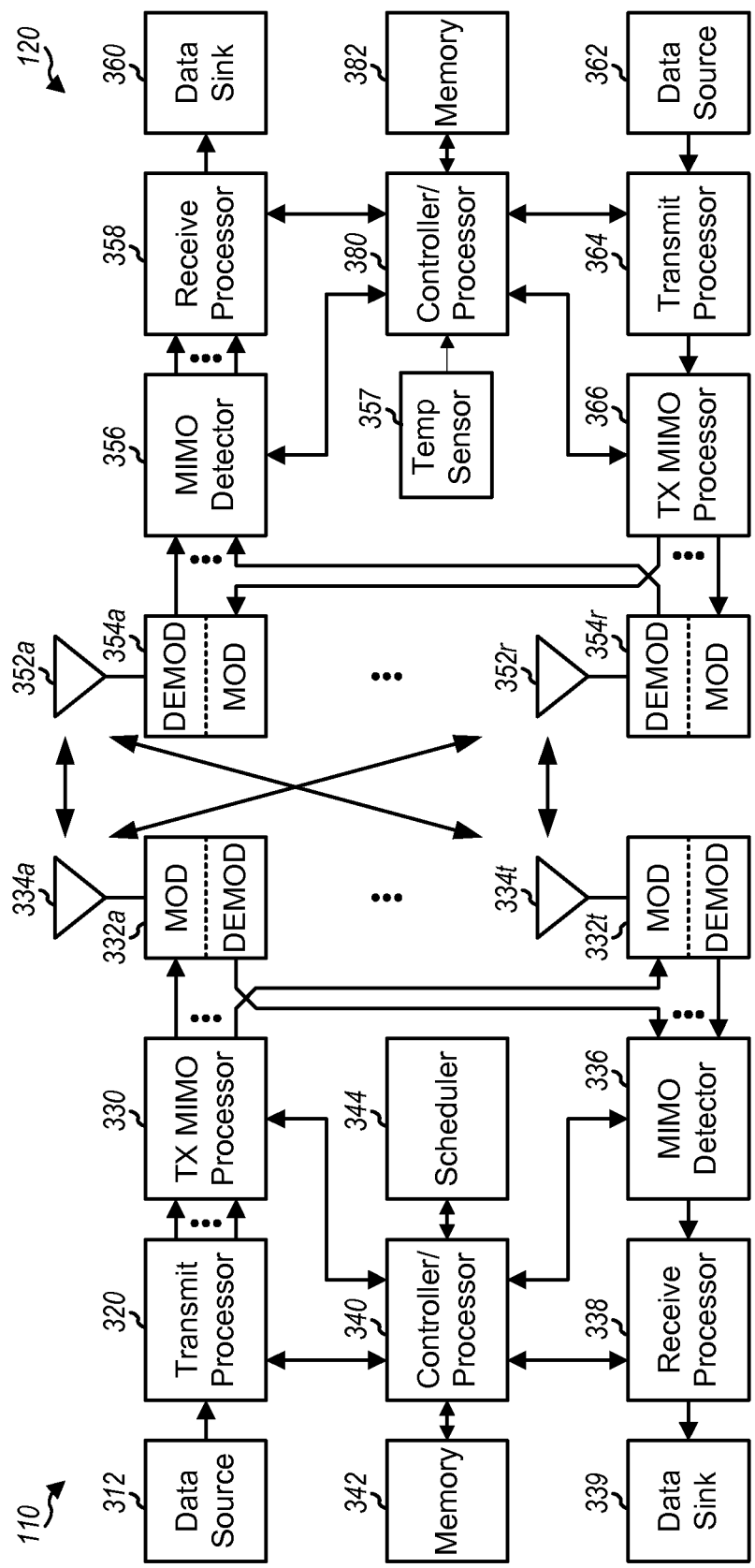
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380. The processor 380 may include modules for performing operations of the methods described herein, by executing instructions held in the memory 382. Such modules may include, for example, modules for measuring data quality, sensing resource constraints, and providing control signals in a control channel for transmitting to the eNB 110. In an aspect, the UE 120 may include a temperature sensor 357 (e.g., a thermistor) coupled to the controller/processor 380 for sensing a temperature of one or more hardware components (e.g., processor 380 or 358) of the UE 120. The processors 358, 380 may monitor resources of the UE to detect a resource constraint. For example, processor 358 and/or processor 380 may monitor for resources such as a system bus resource, memory 382 resource, data sink 360 resource, processor 358 resource, or processor 380 resource to detect a resource constraint. The processor 358 or a measurement module may monitor the receive chain (e.g., of DEMOD 354a-354r or MIMO detector 356) to detect a resource constraint. One or more hardware components of the UE 120 may be or may include a measurement module (e.g., module 1108 of FIG. 11) configured to detect a resource constraint. The resource constraint may be related to a downlink data transmission from the eNB 110. The temperature and/or other resource measurements may be used as input to an algorithm for controlling transmission of data in carrier aggregation, as described in more detail elsewhere herein.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 9-18, and/or other processes for the techniques described herein. The memories 342 and 382 may store data and program codes for the base station 110 and the UE 120, respectively. A scheduler 344 may schedule UEs for data transmission on the downlink and/or uplink. The UE may include one or more additional components as shown and described in connection with FIG. 19.

LTE-Advanced UEs may use spectrum in 20 MHz bandwidths allocated in a carrier aggregation of up to a total of 100 MHz (5 component carriers) used for transmission in each direction. Carrier aggregation may include a primary serving cell (PCell) and one or more secondary serving cells (SCells). The UL/DL carrier corresponding to the PCell is a primary component carrier (PCC), and the UL/DL carrier corresponding to a SCell is a secondary component carrier (SCC). One skilled in the art will recognize that procedures and methods applicable to the SCC and PCC may be applicable to the SCell and PCell, respectively. One skilled in the art will recognize that procedures and methods applicable to the SCell and PCell may be applicable to the SCC and PCC, respectively. The PCC may carry control signaling. All component carriers, including the PCC, may carry traffic data. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

Figure 4A:
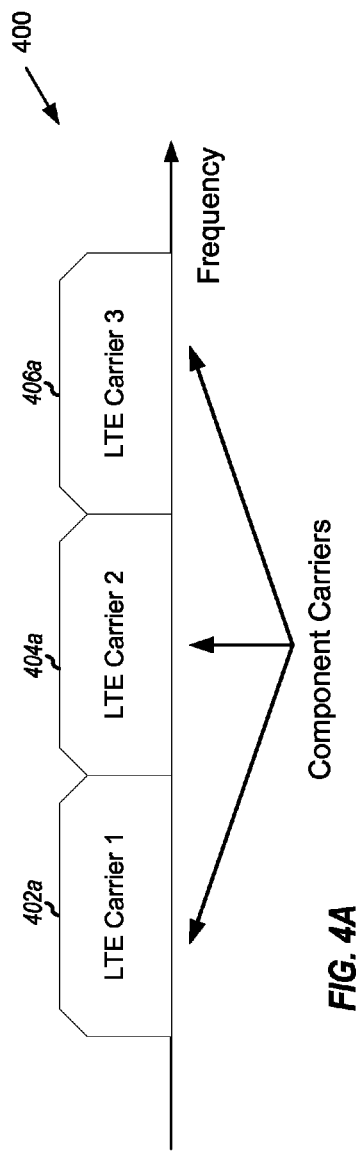
FIG. 4A discloses a contiguous carrier aggregation type.
Figure 4B:
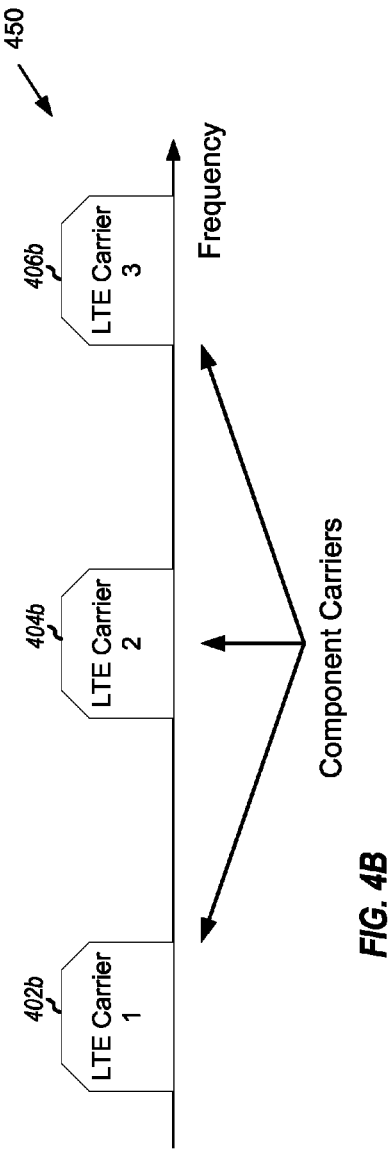
FIG. 4B discloses a non-contiguous carrier aggregation type.

For the LTE-Advanced mobile systems, two types of carrier aggregation (CA) methods have been proposed, contiguous CA and non-contiguous CA. They are illustrated in FIGS. 4A and 4B. Non-contiguous CA 450 refers to configurations wherein multiple available component carriers (e.g., 402b, 404b, 406b) are separated along the frequency band (FIG. 4B). On the other hand, contiguous CA 400 refers to configurations wherein when multiple available component carriers (e.g., 402a, 404a, 406a) are adjacent to each other (FIG. 4A). Both non-contiguous and contiguous CA aggregate multiple LTE/component carriers to serve a single unit of LTE Advanced UE.

Multiple RF receiving units and multiple Fast Fourier Transform (FFT) units may be deployed with non-contiguous CA in LTE-Advanced UE since the carriers are separated along the frequency band. Because non-contiguous CA supports data transmissions over multiple separated carriers across a large frequency range, propagation path loss, Doppler shift and other radio channel characteristics may vary a lot at different frequency bands.

Thus, to support broadband data transmission under the non-contiguous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Figure 5:
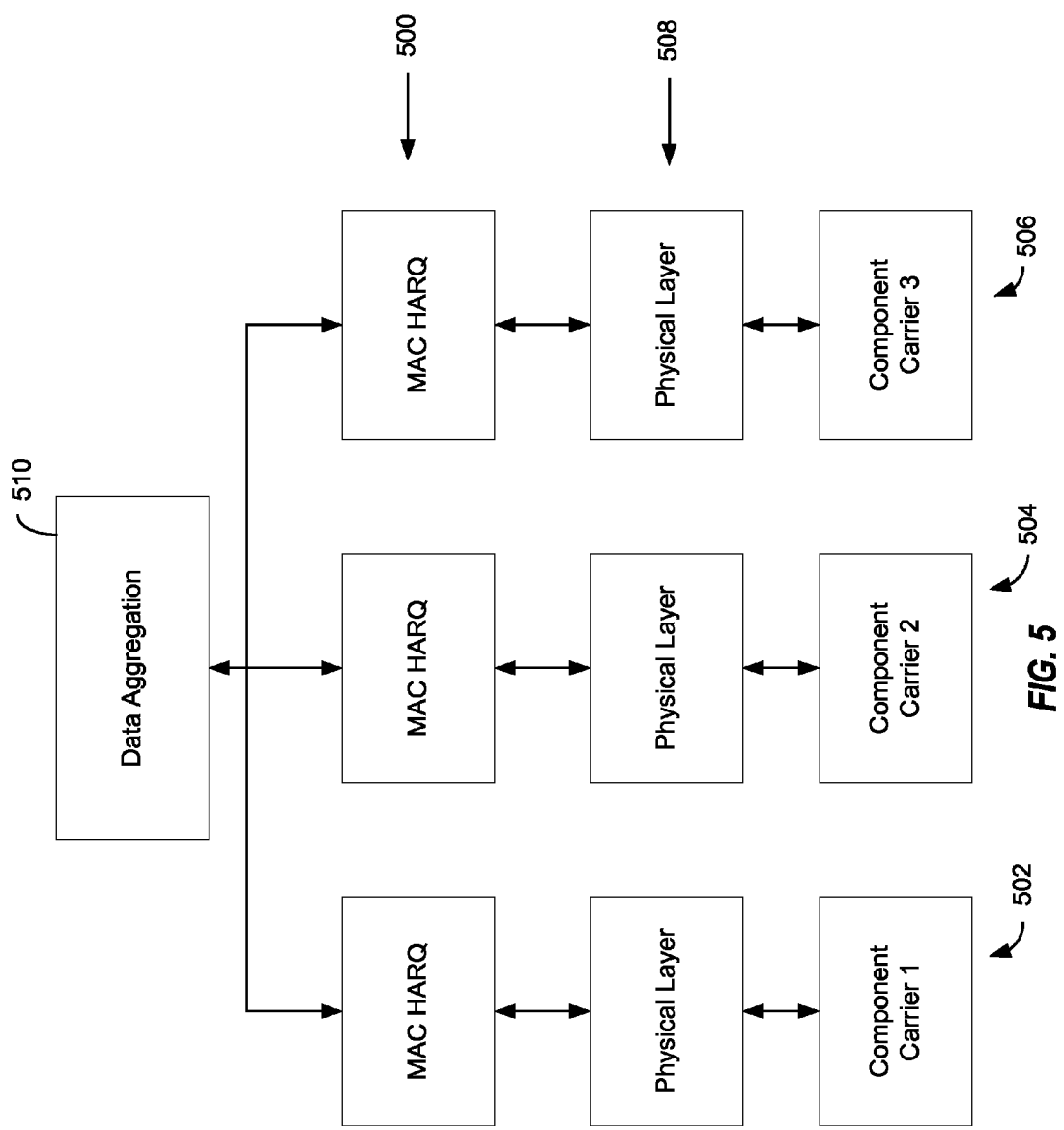
FIG. 5 discloses MAC layer data aggregation.

FIG. 5 illustrates aggregating transmission blocks (TBs) from different component carriers 502, 504, 506 at the medium access control (MAC) layer 500 for an International Mobile Telecommunications-Advanced (IMT-Advanced) system. With MAC layer data aggregation, each component carrier has its own independent hybrid automatic repeat request (HARQ) entity in the MAC layer 500 and its own transmission configuration parameters (e.g., transmitting power, modulation and coding schemes, and multiple antenna configuration) in the physical layer. Similarly, in the physical layer 508, one HARQ entity is provided for each component carrier. A data aggregation process 510 may be performed at the receiver to aggregate data from different component carriers into an aggregated data stream, when the data is directed to a single service or application.

In general, there are three different approaches for deploying control channel signaling for multiple component carriers. The first involves a minor modification of the control structure in LTE systems where each component carrier is given its own coded control channel.

The second approach involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while CA signaling overhead is reduced.

Multiple control channels for different component carriers are jointly coded and then transmitted over the entire frequency band formed by a third CA approach. This approach offers low signaling overhead and high decoding performance in control channels, at the expense of high power consumption at the UE side. However, this approach is not compatible with LTE systems.

Data aggregation at the mobile entity can be resource-intensive. When enabling carrier aggregation (for example in LTE and UMTS), one problem is that enabling the second through $N^{th}$ carriers may place additional burdens on the mobile entity. Such burdens may include, for example, increased system resource usage of CPU processing, memory, bus bandwidth, power consumption, or other factors. Increased resource usage may, in turn, cause hardware systems to get hot, sometimes exceeding desirable temperature thresholds. Other problems may include exhausting battery power too quickly, or reducing available resources for other services. Such increased resource usage may be aggravated when carrier aggregation is enabled concurrently with other resource intensive features, for example interference cancellation, multiple radios concurrently active, concurrent reception of broadcast/multicast services, or other services. In scenarios where resource usage exceeds device resource constraints, it may be desirable to reduce processing requirements for carrier aggregation in a controllable manner, while minimizing the impact on the operation of the mobile device. Current technology, however, may lack effective approaches for achieving the reduced processing requirements for carrier aggregation. The present disclosure therefore addresses these and other limitations of the prior art, by providing methods and apparatus for flow control of downlink data transfer during carrier aggregation.

By adopting the principles and technical details disclosed herein, a mobile entity may reduce processing requirements during concurrency scenarios, and provide a platform supporting carrier aggregation at a lower cost than might otherwise be possible. Aspects of the technology include controlling the data throughput on one or more SCCs based on a resource-constraint status of the mobile entity. The data throughput may be controlled on the downlink on the one or more SCCs. As used herein, "secondary component carrier" or "SCC" includes any carrier other than the first (primary or anchor) component carrier, whether second, third, fourth, or any other rank other than the first. The mobile entity may detect its own resource status, and reduce or increase data throughput in response to the detected status, using one or more techniques described herein. The techniques may include reporting a lower channel quality (CQI) status for a SCC than an actual channel quality experienced at the UE. The lower CQI may be referred to herein as a "quasi-status CQI" because it is not an indicator of the actual CQI experienced at the UE. Reporting a quasi-status CQI may cause the eNB to reduce or shut down data transmission on the SCC. The techniques may include modifying a reported Precoding Matrix Indicator (PMI) and/or the Rank Indicator (RI), for example to cause an eNB to switch to single layer MIMO. The PMI may be associated with an index of a preferred precoding matrix to improve MIMO operation. The techniques may include degrading the receive path in the downlink, for example by injecting noise or distorting the received signal, and reporting CQI status based on the degraded signal. This may, in turn, cause the eNB to reduce the data rate on the SCC. The techniques may include reporting a higher number of negative acknowledgements (NACKs) for the SCC than are justified by the data received thereon, again indicating a quasi-status CQI. The techniques may include reporting poor or no event triggered measurement results for the SCC. Each of these techniques may cause the network to reduce data throughput on the SCC, without penalizing data throughput on the first carrier or other carriers, and thereby help the UE to reduce its system resource requirements. The reduced system resource requirements may relieve a resource constraint at the UE.

Another resource constraint may be encountered for embodiments supporting simultaneous voice and LTE (SV-LTE). Such embodiments may require that the UE support receiving One Times Radio Transmission Technology (1×RTT) pages while in LTE Radio Resource Control (RRC) connected mode, and support mobile initiated and mobile terminated voice calls on 1×RTT while in LTE RRC connected mode. However, due to hardware limitations, it may not be possible to receive or transmit on multiple carriers requiring MIMO operation, while the UE is on 1×RTT. In addition, for many hardware configurations, the UE may not be able to monitor the SCC while on 1×RTT. LTE Rel. 10 does not provide procedures to allow the UE to communicate with the eNB regarding the change in UE capability to support carrier aggregation. Also, the UE currently cannot notify the eNB that the UE is dropping/deactivating the SCC.

Resource constraints as summarized above may be managed using various approaches as described herein. These new approaches may provide certain advantages over existing approaches. First, use of the approaches may enable a UE with two or more carriers activated to receive a page on 1×RTT. Second, use of the approaches may enable a UE with two or more carriers activated to either drop a carrier or disable MIMO operation for a secondary cell so that a receive chain may be allocated to 1×RTT. Third, use of the approaches may enable a UE with a specified capability for carrier aggregation and currently on 1×RTT to prevent the network from activating the SCC. Fourth, use of the approaches may enable a UE to re-activate a de-activated SCC, after a 1×RTT call is completed.

The carrier aggregation capabilities of the UE may be negotiated during a UE capability transfer that occurs during initial attach. SCC(s) may be configured by the RRC layer, which can happen every time the UE establishes a RRC connection, e.g., when the UE moves from LTE IDLE to CONNECTED state, or while the UE is in RRC CONNECTED state. However, the SCC(s) may remain de-activated until a MAC activation control element is received to activate the carriers. If the activation MAC control element is received at time 'n,' then the UE may decode Physical Downlink Control Channel (PDCCH) and Physical Downlink Scheduling Channel PDSCH on the SCC starting at, e.g., time n+8 milliseconds. This process 600 is illustrated in FIG. 6, with the steps moving downward as illustrated by the timeline. Initially, at step 602 (time t1), the eNB 110 may query the capabilities of the UE 120, e.g., by transmitting a UECapabilityEnquiry message to the UE 120, to which the UE 120 may respond with UE 120 capability information, at step 604 (time t2). The UE 120 capability information may be sent via a UECapabilityInformation message. At step 606 (time t3), the eNB 110 may then provide a message configuring one or more SCCs for the connection, e.g., via an RRCConnectionReconfiguration message. At step 608 (time t4), the UE may respond, e.g., via an RRCConnectionReconfiguration-Complete message, with an acknowledgement after receiving the RRC configuration message and after configuring the connection. Once the eNB 110 transmits, at step 610 (time t5), the MAC control element for activating the SCC, the SCC is activated and may be used for data transmission, typically, 8 milliseconds later, at time t6. Thereafter, starting at time t6, the SCC is active.

However, after the UE 120 advertises support for carrier aggregation and the band combination, and when the SCC(s) are activated, there is no existing method for the UE to drop/deactivate one or more of the activated carriers. Several options may be used to resolve this shortcoming, which may be divided into two approaches. In one approach, changes to the UE 120 may enable the UE 120 to address the above issues through use of a new MAC control element. In a second approach, the UE 120, without using new protocol control elements, acts autonomously within an existing system to minimize the impact on user experience when dropping the SCC, and to provide certain functionalities while satisfying resource constraints.

According to one approach, a new MAC control element for the UE 120 to request the eNB 110 to de-activate/re-activate one or more SCCs may be utilized. Support for the new MAC control element may be made optional for an eNB 110. The new MAC control element may be configured to enable the UE 120 to inform the eNB 110 that one or more of the carriers should be activated or de-activated. De-activation of the carrier may remain under the eNB's 120 control, which may de-activate the SCC by sending the de-activation MAC control information element.

Figure 7A:
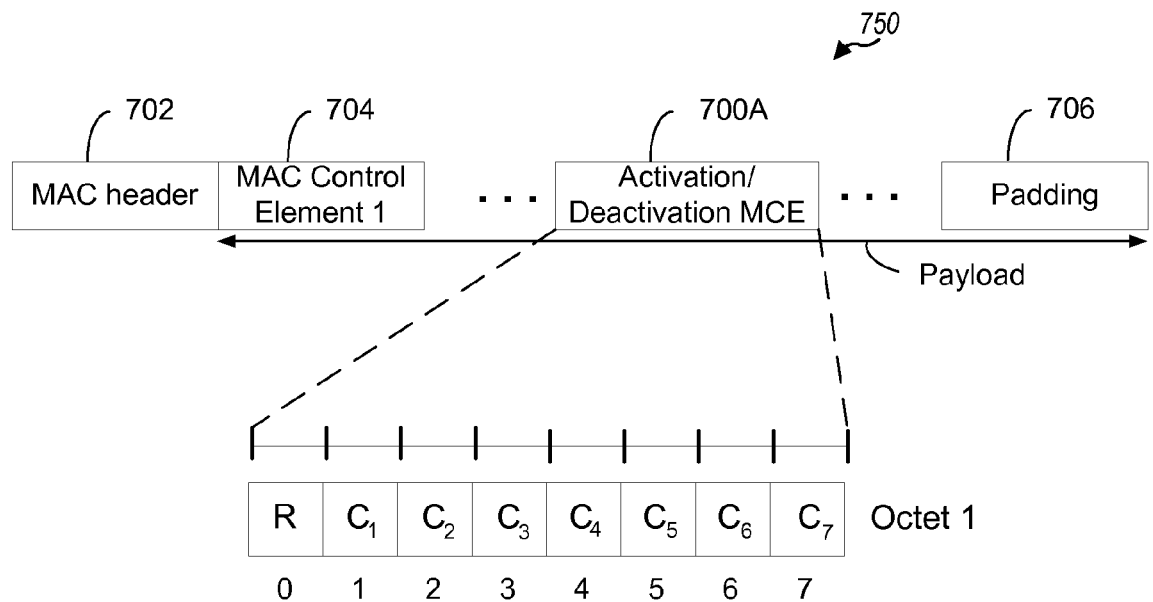
FIG. 7A is a diagram illustrating an example of a new MAC control element octet for deactivating or reactivating a secondary component carrier.

FIG. 7A illustrates a MAC PDU 750 including a new MAC control element (MCE) for activation/deactivation of SCCs 700A. The MAC packet data unit (PDU) 750 includes the MAC header 702 containing Logical Channel Identifier (LCID) data and the MAC data payload (e.g., including MCE 704, MCE 700A, padding 706). The new MAC control element 700A may be as specified by the LCID shown in Table 1 below for the UL shared channel (SCH). The MAC control element 700A may be included in the LCID values table, for example, at index 01011. Table 1 may also include other fields such as CCCH at index 00000, Identity of the logical channel, at indexes 00001-01010, etc. The MAC control element 700A may have a fixed size, e.g., of a single octet containing seven C-fields and one R-field, as shown in FIG. 7A. The Activation/Deactivation request MAC control element 700A may be defined as follows. For each C-field, $C_i$: if there is an SCC activated with an index value (e.g., "SCellIndex 'i'", as specified in 3GPP TS 36.321) and the corresponding bit is set to zero, this field indicates the UE 120 is requesting deactivation of the SCell with, e.g., SCellIndex 'i'. If the SCell is deactivated and the corresponding field is set to one, then the UE 120 is requesting activation of the SCell. Alternatively, a bit may be set to one to request deactivation of the SCell, and a bit may be set to zero to request activation of the SCell. The R-field contains a reserved bit, which may be set to "0".

Figure 7B:
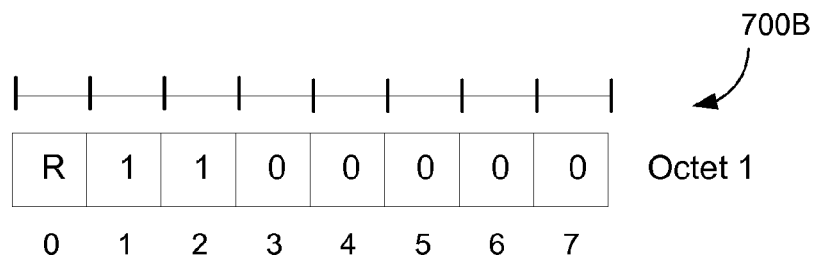
FIG. 7B is a diagram illustrating an exemplary MAC control element octet for activating two secondary component carriers.

In the example illustrated in FIG. 7B, the Activation/Deactivation request MAC control element 700B includes two bits set to '1' with the other bits set to '0'. The two bits set to '1' at index 1 and index 2 (e.g., SCellIndex=1 and 2) indicates a request to activate (if not already activated) first and second SCCs (e.g., SCellIndex=1 and 2) and to deactivate (if not already deactivated) the rest of the SCCs at indexes 3 through 7. The number, e.g., a maximum number, of SCCs may be configured through signaling at the RRC layer. For example, the UE may be configured for any number of SCCs from one through seven. SCell bits corresponding to SCell indexes that are not configured for SCC may be ignored. For example, when the UE is configured for a maximum of two SCCs, the SCell indexes (e.g., SCell indexes 1 and 2) corresponding to the two SCCs are processed while the rest of the bits (e.g., corresponding to SCell indexes 3-7) are ignored. The value at index 0 may be a reserved bit (e.g., R-field) set to '0'.

TABLE 1

Values of LCID for UL-SCH

| Index | LCID Values |
| --- | --- |
| 00000 | CCCH |
| 00001-01010 | Identity of the logical channel |
| 01011 | Activation/Deactivation request |
| 01100-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Figure 8:
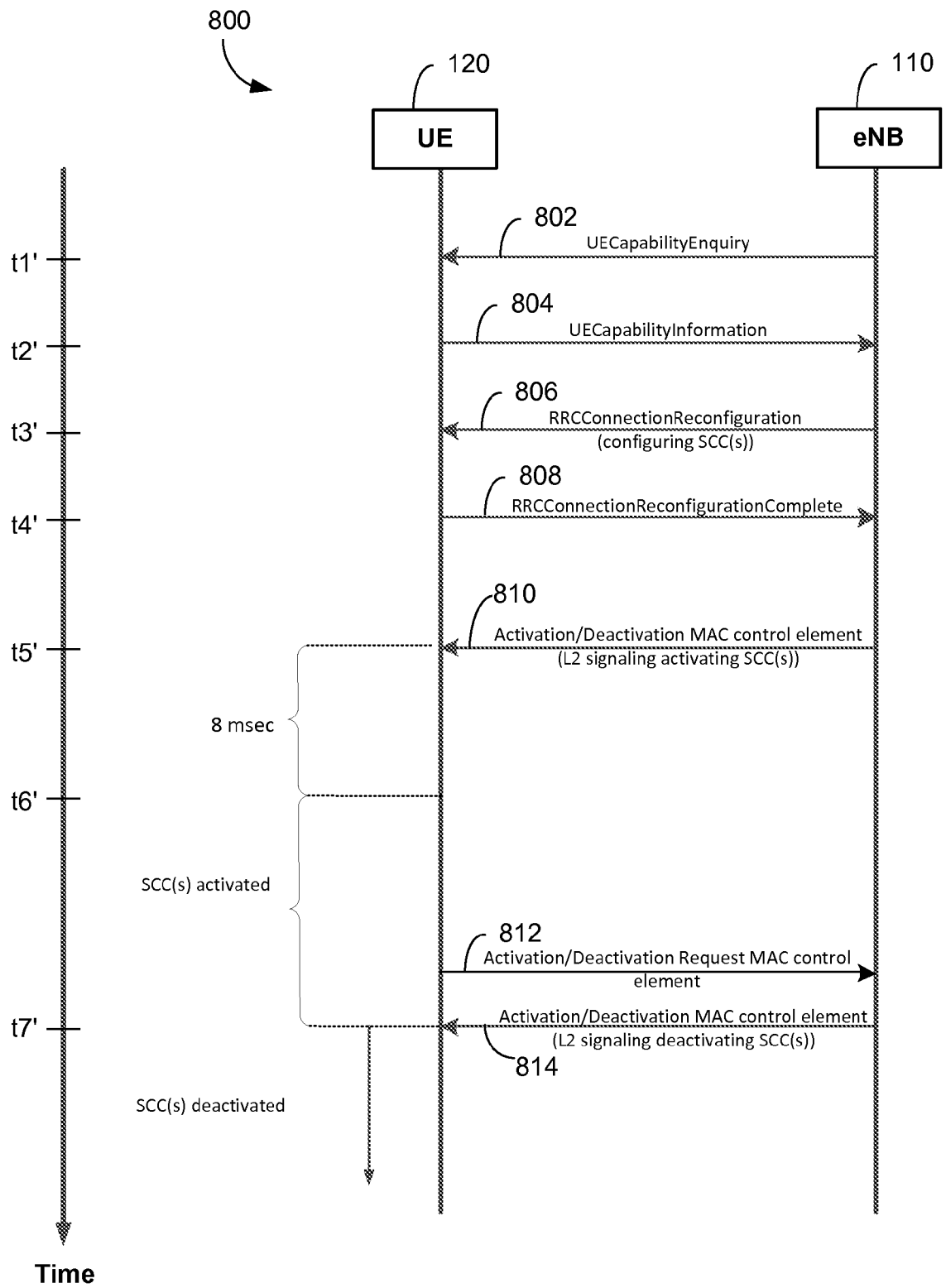
FIG. 8 is a sequence diagram illustrating an example of a call flow including the new Media Access Control (MAC) control element, of FIG. 7, for deactivating or reactivating a secondary component carrier.

A call flow exemplifying an approach for activating/deactivating SCCs based on the new MAC control element 700A is illustrated in FIG. 8. The elements 802-810 (and associated time markers t1'-t6') correspond to the elements 602-610 (and associated time markers t1-t6) in FIG. 6, and are not described again. The new Activation/Deactivation request MAC control element 700A may be transmitted by the UE at step 812, after an SCC has been activated. In response to receiving the Activation/Deactivation request MAC control element 700A, at step 814, the eNB 110 sends a message to activate/deactivate the SCCs from the Activation/Deactivation request MAC control element 700A. In the example shown in FIG. 8, the UE 120 may request deactivation of one or more SCCs at step 812, and the eNB 110 deactivates the requested SCCs at step 814. Thereafter, starting at time t7', the SCC(s) is/are deactivated.

Adding this activation/deactivation capability may allow the UE 120 to provide the advantages summarized above. Whether the UE 120 decides to de-activate the SCell during 1×RTT pages may depend on the duration of 1×RTT monitoring. For example, for a 1×RTT monitoring duration of less than about 50 ms, the UE 120 may not need to deactivate the SCC during 1×RTT page monitoring.

Figure 9:
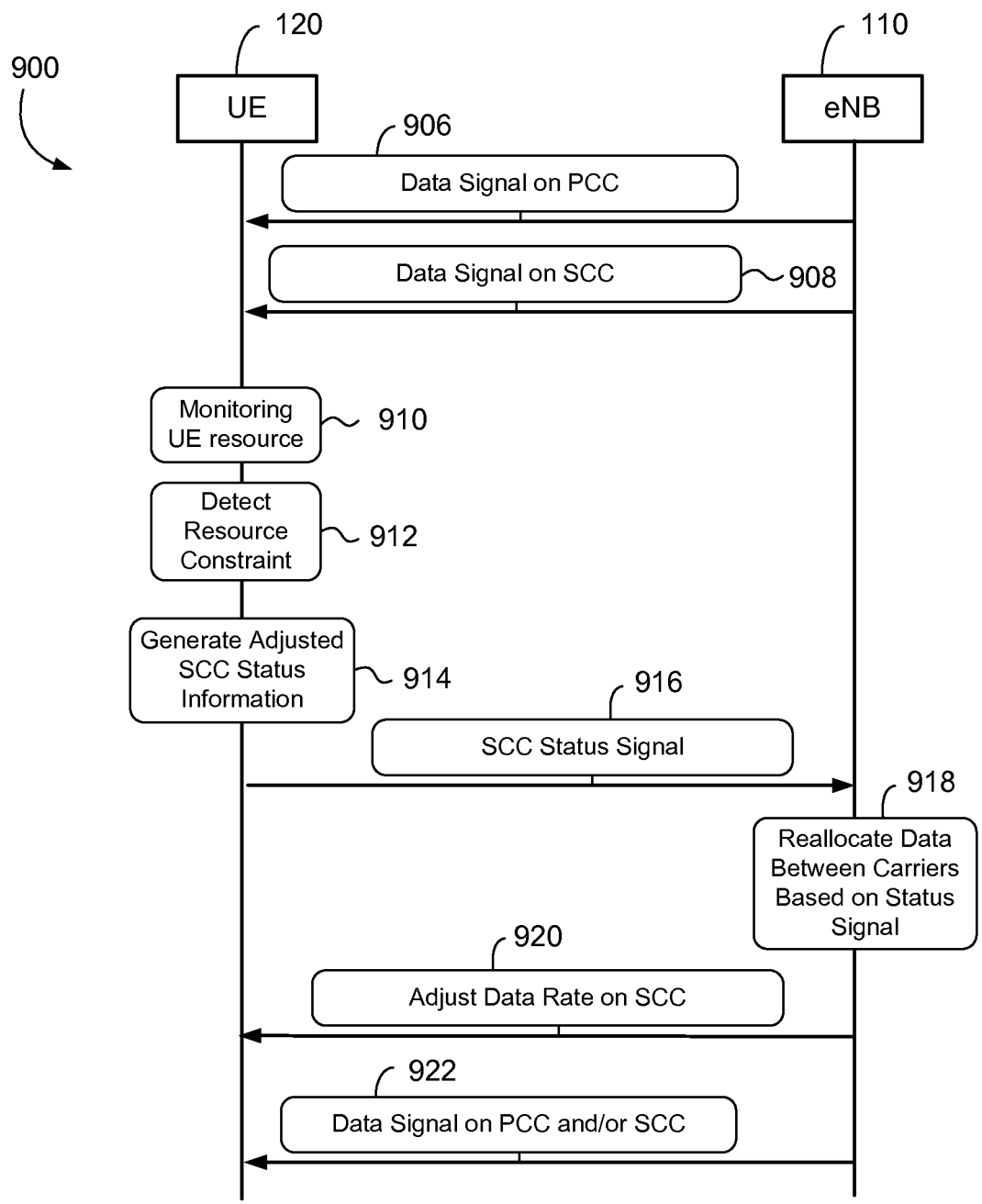
FIG. 9 is a sequence diagram illustrating an example of a call flow for downlink data transfer flow control during carrier aggregation, without using a new MAC control element.

The UE 120 may achieve an advantage summarized above without using the new MAC control element or other explicit control signaling. In this case, the UE 120 may decide to drop the SCC(s) without explicitly signaling to the eNodeB that the SCC is dropped. However, the UE 120 may implicitly convey this information so that the loss of the SCC(s) occurs more gracefully. An overview of a method 900 for implicit control is illustrated in FIG. 9. At step 906, an eNB 110 provides data on a PCC, while at step 908, the eNB 110 provides data for aggregating with the PCC data on the SCC. The UE 120 receives and aggregates the data from the multiple carriers.

At step 910, the UE 120 monitors resource usage, including for example one or more of 1×RTT pages or requests, temperature, power, memory, bus bandwidth, or other resources. At step 912, the UE 120 detects a resource constraint-related event indicating that use of the SCC should be reduced or stopped. At step 914, the UE 120 generates adjusted status information, also referred to herein as quasi-status information, for implicitly signaling reduction in use of the SCC. At step 916, the UE 120 signals the quasi-status information to the eNB 110, using a conventional control channel, for example, a PDCCH. At step 918, the eNB 110 may reallocate data transmission from one or more SCCs, based on the quasi-status information. The eNB 110 may cease transmission entirely on the SCC, in response to the quasi-status information (not shown). In an alternative shown at step 920, the eNB 110 may adjust the data rate on the SCC in response to the quasi-status information. At step 922, the eNB 110 provides data, optionally at an adjusted rate, on the PCC and/or on a different SCC. For example, if the UE 120 is receiving a particular data service on multiple carriers prior to the adjustment, after the adjustment the eNB 110 may increase the data rate for the data service on the remaining carriers, to the extent capacity is available.

The UE 120 may use various techniques for generating quasi-status information. According to one technique, the UE may ramp down CQI, or start reporting CQI=0, for the SCC, despite actually experiencing a higher CQI than reported to the eNB 110. This technique, in addition to the fact that UE does not report ACK/NACKs for DL HARQs sent on the downlink, may result in the eNB 110 ceasing scheduling on the affected carrier(s) and eventually de-activating the affected carrier(s).

The UE may start the CQI ramp down in advance of a 1×RTT call/paging, so that the SCC becomes deactivated to avoid conflicting with the 1×RTT call. For example, the UE may know the times to monitor for 1×RTT paging or may know when the UE will receive a 1×RTT call. In such instances, the UE may ramp down in advance by sending lower values for CQI reports before the 1×RTT call/paging. However, the duration for which the UE 120 has to report low (or zero) CQI before the network deactivates the secondary cell depends on the network's behavior. Therefore, the UE 120 may have to ignore the SCC and not monitor its PDCCH, to enable a move to 1×RTT reception before the SCC is explicitly deactivated by the eNodeB.

In an aspect, monitoring 1×RTT pages at the mobile entity may include adopting page monitoring gaps similar to the measurement gap in LTE but longer (around 30 ms) and less frequent (paging cycle is typically around 2 seconds). This implementation, however, may have to be negotiated with the LTE network and carrier.

In an alternative aspect, instead of disabling the SCC, the UE 120 may be able to keep the carrier activated, but without the second receive chain required to support MIMO on the SCC. This means that UE goes from "PCell with MIMO+SCell with MIMO" to "PCell with MIMO+SCell with Multiple-Input Single Output (MISO)+1×", which may be done by specifying a rank of 1 in the Rank Indicator (RI) reports. The RI may represent the number of MIMO layers supported based on current channel conditions. This approach may provide the advantages that the UE can monitor PDCCH of the SCell and that the RI=1 reporting may be transparent to the UE and network. However, the SCC is usually configured for load balancing and/or peak data rate. In such a configuration the UE dropping down to rank 1 may share some disadvantages with the SCC deactivated. Similar to the above embodiment (CQI ramp down and SCell drop), the step of disabling MIMO may depend on the eNB 110 scheduling over two carriers.

In another alternative aspect, the UE 120 may initially disable MIMO operation, and drop the SCC after a lag period of some predefined duration. Based on the above discussion, a gradual approach may be utilized where the UE 120 goes from "PCell-MIMO+SCell-MIMO" to "PCell-MIMO+SCell-MISO+1×", and then to "PCell-MIMO+1×". In this case, the UE's 120 CQI ramp down reports are configured to simulate a smoother channel degradation scenario and give the network time and information to deactivate the SCC with few or no HARQ failures.

In cases where the UE 120 is on a 1×RTT call and has already negotiated carrier aggregation capability with the eNB 110, the UE 120 may be enabled to prevent activation of SCC(s), using the following technique. Activation of a particular SCC may be based on the LTE event-triggered measurement reports A1 and A4 by the UE 120, where A1 indicates that signal quality from the serving eNB has improved above a fixed threshold, and A4 indicates that signal quality from a neighbor eNB has improved above a fixed threshold. If the A1 event is defined for a particular SCC, the UE may include in the A1 report the SCell signal quality corresponding to the particular SCC. If the A4 event is defined for a particular SCC, the UE may include in the A4 report the signal quality of the neighboring eNB of the SCC. Using the A1 and A4 measurement reports, the eNB may decide to activate, deactivate, release, and/or add another SCell. The UE 120 may report quasi-status measurement reports indicating that the SCC is worse than the set threshold for activation. In such an approach the eNodeB is not expected to activate the SCC. Such quasi-status reporting should not affect handover scenario on the PCC.

However, in deployment scenarios where handover from a PCC to a SCC is needed at a cell edge, the above quasi-status reporting technique may interfere with the handover. To minimize such interference, the technique may be modified so that the UE 120 also selectively starts reporting SCC measurements when the UE 120 encounters weak coverage on the current PCC, such that edge of cell performance is not negatively impacted. In case the SCC is reactivated, the UE 120 may again report low CQI on that SCC.

Figure 10:
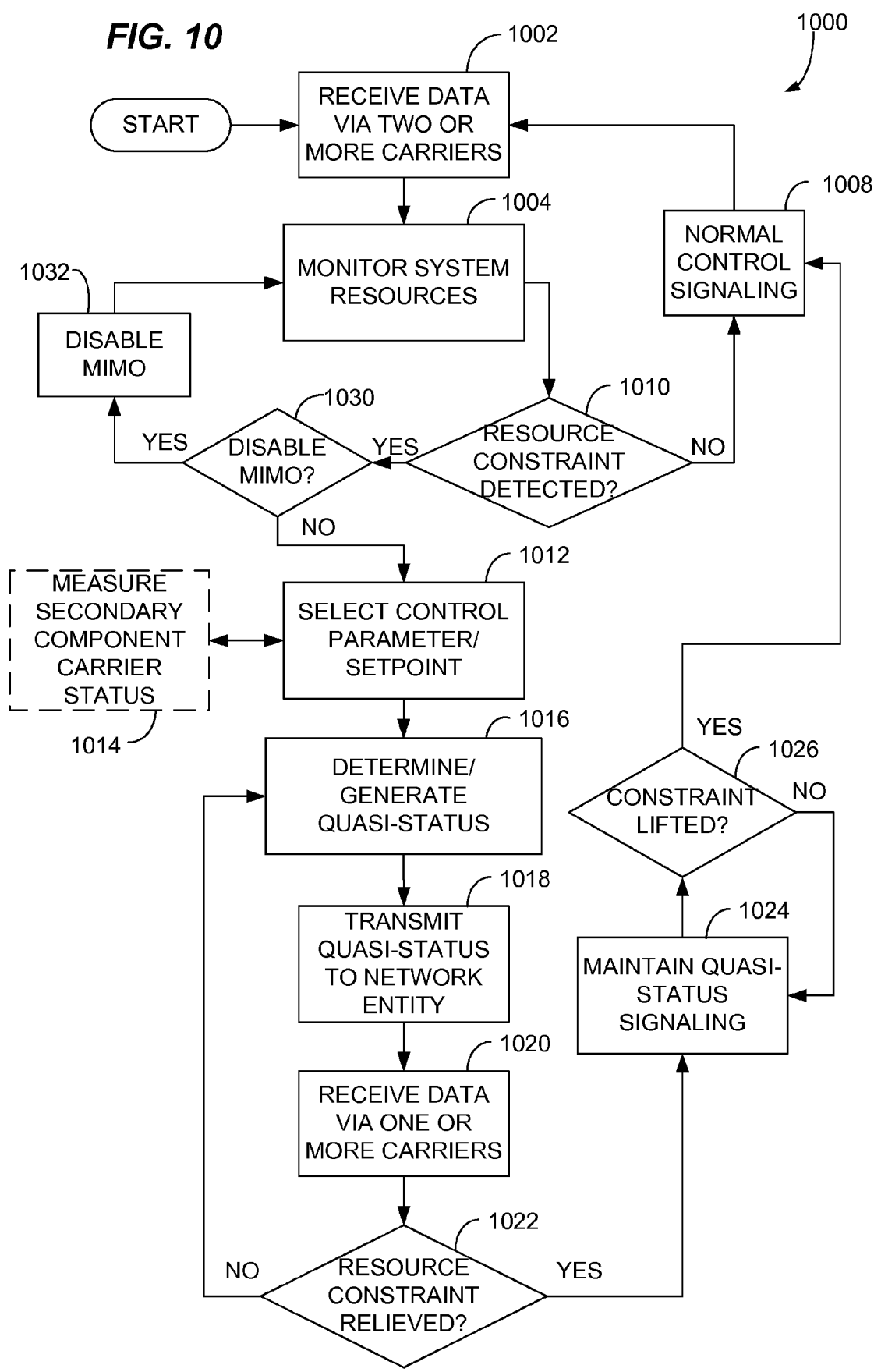
FIG. 10 is a flow chart illustrating an example method for downlink data transfer flow control during carrier aggregation, without using a new MAC control element, for performance by a mobile entity.

FIG. 10 shows an example of operations in a method 1000 that may be performed by a mobile entity, e.g., UE 120, embodying aspects of the techniques described above. At 1002, the mobile entity may receive data via two or more carriers in a carrier aggregation configuration. At 1004, the mobile entity may monitor system resource to detect occurrence of an event indicating a resource constraint that requires reducing or eliminating use of one or more SCCs. Resource constraints may include, for example, system resource utilization constraints including a CPU processing utilization constraint, a memory utilization constraint, a bus bandwidth utilization constraint, a power consumption utilization constraint, and/or some other constraints. An event related to exceeding a resource constraint may be detected using sensors such as temperature or voltage sensors, or may be measured by counting data throughput or other state information, etc. These events may also be detected using processors or measurement modules of the mobile entity. If no event related to exceeding a resource constraint is detected at 1010, the mobile entity may resume normal operation 1008, including status reporting without any quasi-status information.

If an event is detected indicating that a resource constraint has been exceeded, the mobile entity may determine at 1030 whether or not to disable MIMO on the SCC. For example, if MIMO is already disabled or not enabled, further disabling is not possible. Also, the type of the resource constraint or a current state of the mobile entity may bear on this determination. As noted above, the mobile entity, e.g., UE 120 may disable MIMO operation at 1032 and drop the SCC after a lag period of some predefined duration.

If further disablement of MIMO is not to be performed, the method may branch to 1012 to select a control parameter and set point to control data transmission on the SCC. For example, for a particular control parameter a corresponding set point may be set to a value (e.g., zero) to disable the SCC when the resource constraint is exceeded. The control parameter may include CQI, ACK/NACK, event reporting, some combination of these parameters, and/or some other parameter. This selection may be preconfigured or may be made on the fly in response to the status of the mobile entity. To assist in selecting a parameter and set point, the mobile entity may optionally measure a SCC status at 1014, for example by measuring a data rate of the SCC.

At 1016, the mobile entity may determine or generate a quasi-status for the selected parameter. For example, the mobile entity may set the CQI or ACK/NACK to the maximum or minimum of a possible range, or at some intermediate value based on a relationship to an intended result or set point. Control methodology as known in the art for closed-loop parameter control (e.g., proportional-integral control) may be used to determine a quasi-status value of the parameter to report for the SCC. At 1018, the mobile entity may transmit the quasi-status value to the eNB, for example using an applicable control channel. Subsequently, at 1020, the mobile entity may continue to receive data via one or more carriers. The data rate on the SCC may be reduced or dropped to zero.

The mobile entity may determine, at 1022, whether the resource constraint has been relieved by reduction in the data rate or disablement of the SCC. For example, if the utilization of resources has not dropped below a threshold value then the mobile entity may repeat the operations 1016-1020. Hysteresis may be utilized to avoid ping ponging between detecting the resource constraint and detecting no resource constraint. For example, two hysteresis threshold values may be used. A first threshold value may be used for determining resource utilization associated with the resource constraint, and a second threshold value may be used for determining resource utilization associated with relief of the resource constraint. If resource relief is achieved, the mobile entity may maintain the quasi-status signaling at 1024 until the constraint is lifted, for example because a 1×RTT connection is terminated, another service putting significant demands on resources is terminated, additional resources (e.g., power) are made available, etc. If the mobile entity determines the constraint is lifted at 1026, it may resume normal control signaling at 1008. If not, it may maintain quasi-status signaling at 1024.

Figure 11:
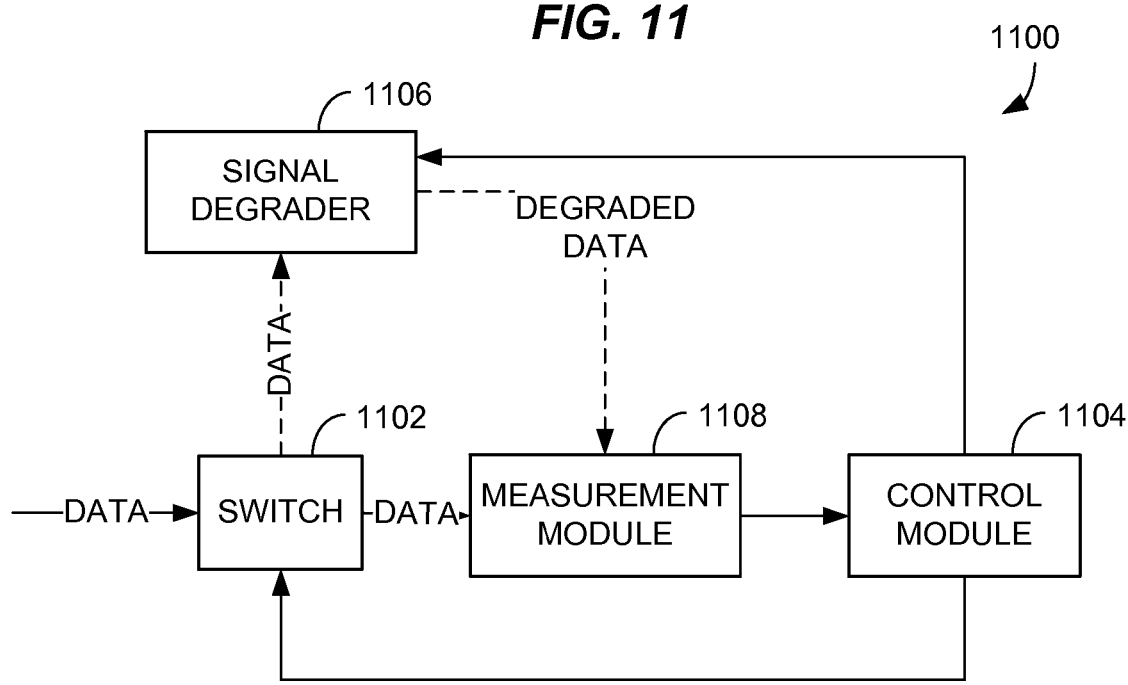
FIG. 11 is a block diagram illustrating components of a mobile entity for downlink data transfer flow control during carrier aggregation, using a controllable signal degradation module.

In some embodiments, the mobile entity may be equipped with components 1100 as shown in FIG. 11, for degrading a signal quality. Instead of determining and generating a quasi-signal, it may be advantageous to degrade the signal quality received on the SCC, and then generate CQI, ACK/NACK, or other feedback to the eNB using conventional techniques. A control module 1104 may include a processor programmed to determine when to reduce, increase or stop a downlink data transmission on a SCC. The control module 1104 may be coupled to a switch 1102 for selectively directing data through a signal degrading component 1106 based on the control module 1104 determining that a reduced signal quality should be reported. If the control module 1104 determines not to report a reduced signal quality, the switch directs the data to the measurement module 1108. The signal degrading component 1106 may be, or may include, passive and/or active electronics for degrading a signal by introducing noise or interference, reducing the signal amplitude, or introducing some other distortion or blockage. One of ordinary skill can select or provide a suitable component 1106. The component 1106 may be an active component coupled to the control module 1104, in which case the amount of degradation introduced by the component may be controlled. If the control enables reducing degradation to zero, the switch 1102 may be omitted. Degraded data from the signal provider may be provided to a measurement module 1108, which may be a conventional module in the receive chain, of the mobile entity, for generating channel quality indicators, ACK/NACKs, event reports, or other suitable control signals. Measurement module 1108 may provide the generated signals to the control module 1104. The control module 1104 may use the signals from the measurement module 1108 for feedback control. For example, the control module 1104 may control the signal degrader 1106 to increase or decrease the signal degradation based on the signals from the measurement module 1108.

In view of exemplary systems shown and described herein, methodologies that may be implemented in accordance with the disclosed subject matter will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Figure 12:
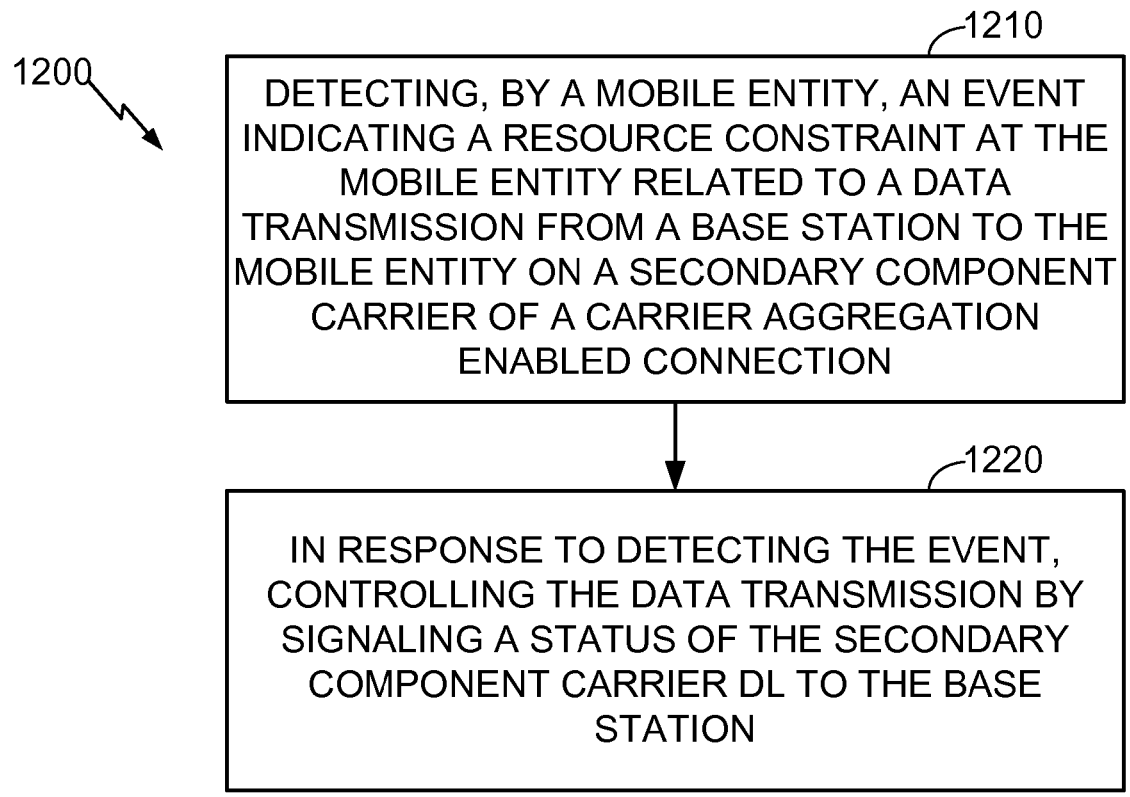

A method 1200 for controlling a secondary component carrier DL in a wireless communication network using carrier aggregation, as shown in FIG. 12, may be performed by a mobile entity. The mobile entity may comprise an entity of any of the various forms described herein, for example, a UE.

The method 1200 may include, at 1210, detecting, by a mobile entity, an event indicating a resource constraint at a mobile entity related to a data transmission from a base station to the mobile entity on a secondary component carrier of a carrier aggregation enabled connection. The method 1200 may further include, at 1220, in response to detecting the event, controlling the data transmission by signaling a status of the secondary component carrier DL to the base station. The status may be a quasi-status. The resource constraint may include one of a CPU processing utilization constraint, a receive chain constraint, a bus bandwidth constraint, a power constraint, or an operating temperature constraint, or some other constraint.

FIGS. 13-18 show further optional operations or aspects 1300-1800 that may be performed by the mobile entity in conjunction with the method 1200 for controlling a secondary component carrier DL in a wireless communication network using carrier aggregation. The operations shown in FIGS. 13-18 are not required to perform the method 1200. Diagrammed operations may be independently performed and not mutually exclusive. Therefore any one of such operations may be performed regardless of whether another downstream or upstream operation is performed. If the method 1200 includes at least one operation of FIGS. 13-18, then the method 1200 may terminate after the at least one operation, without necessarily having to include any subsequent downstream operation(s) that may be illustrated.

Figure 13:
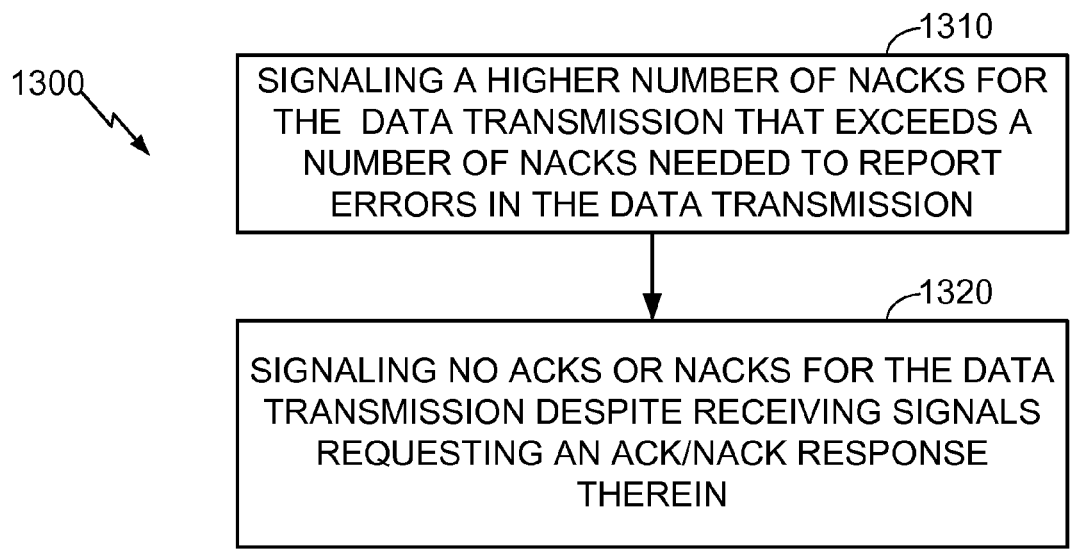

Referring to FIG. 13, method 1200 may include one or more of the additional operations 1300. Signaling the status in the method 1200 may further include, at 1310, signaling a higher number of NACKs for the data transmission that exceeds a number of NACKs needed for the number of errors in the data transmission. Signaling the status in the method 1200 may further include, at 1320, signaling no ACKs or NACKs for the data transmission despite receiving signals requesting an ACK/NACK response therein. As noted, this may cause the eNB to stop using the secondary component carrier for a transmission to the mobile entity.

Figure 14:
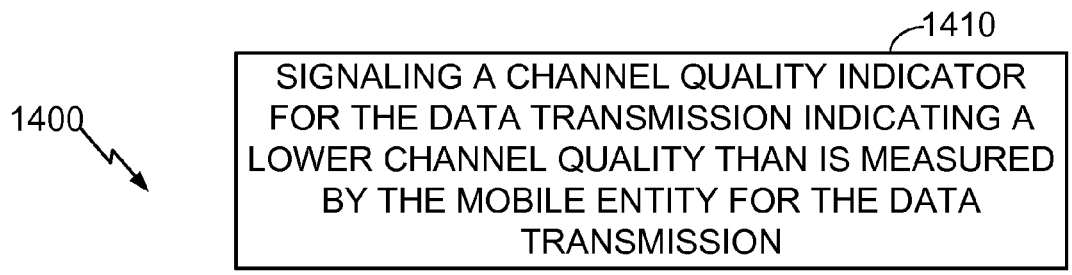

Referring to FIG. 14, method 1200 may include one or more of the additional operations 1400. Signaling the status in the method 1200 may further include, at 1410, signaling a channel quality indicator for the data transmission indicating a lower channel quality than is measured by the mobile entity for the data transmission. For example, the channel quality indicator may be set to zero. Doing so may cause the eNB to stop using the secondary component carrier for a transmission to the mobile entity.

Figure 15:
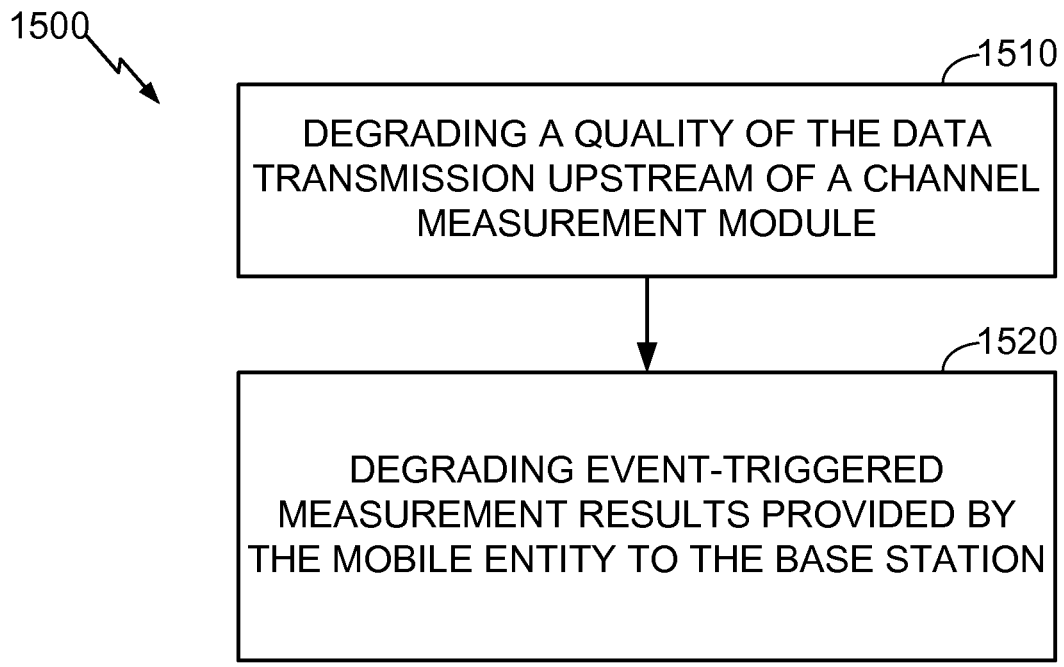

Referring to FIG. 15, method 1200 may include one or more of the additional operations 1500. The method 1200 may further include, at 1510, degrading a quality of the data transmission upstream of a channel measurement module. Signaling the status in the method 1200 may further include, at 1520, degrading event-triggered measurement results provided by the mobile entity to the base station.

Figure 16:
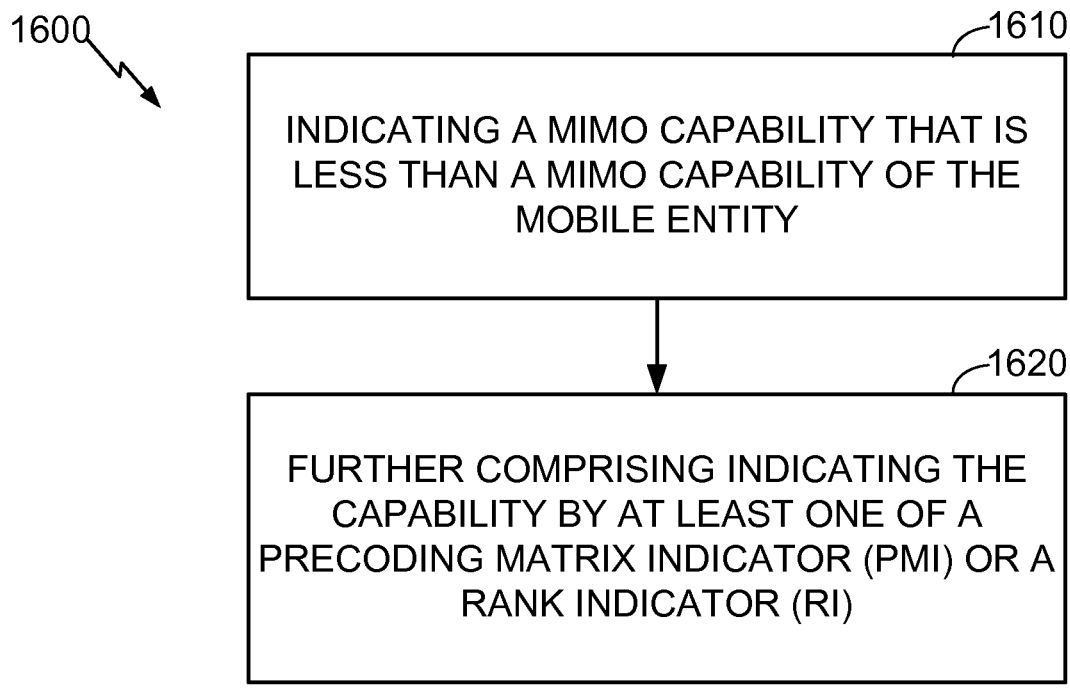

Referring to FIG. 16, method 1200 may include one or more of the additional operations 1600. Signaling the status in the method 1200 may further include, at 1610, indicating a MIMO capability that is less than a MIMO capability of the mobile entity. Signaling the status in the method 1200 may further include, at 1620, further comprising indicating the capability by at least one of a Precoding Matrix Indicator (PMI) or a Rank Indicator (RI).

Referring to FIG. 17, method 1200 may include one or more of the additional operations 1700. The method 1200 may further include, at 1710, receiving a paging message, and freeing up resources for an incoming call by disabling carrier aggregation on the secondary component carrier. The method 1200 may further include, at 1720, receiving a request to make an outgoing call, and freeing up resources for the outgoing call by disabling carrier aggregation on the secondary component carrier. Disabling carrier aggregation on the secondary component carrier may include, for example, signaling a quasi-status of the secondary component carrier to the base station to implicitly require that the base station disable the secondary component carrier for communication with the mobile entity.

Referring to FIG. 18, method 1200 may include one or more of the additional operations 1800. The method 1200 may further include, at 1810, monitoring a data rate of the data transmission. The method 1200 may further include, at 1820, observing, by the monitoring, the event comprising a data rate transitioning outside of a defined range or set point. The method 1200 may further include, at 1830, controlling the data transmission by maintaining the data rate within the defined range or set point. For example, the data rate may be maintained using any suitable closed-loop control algorithm to control the quasi-status reporting based on feedback relative to one or more set points.

Figure 19:
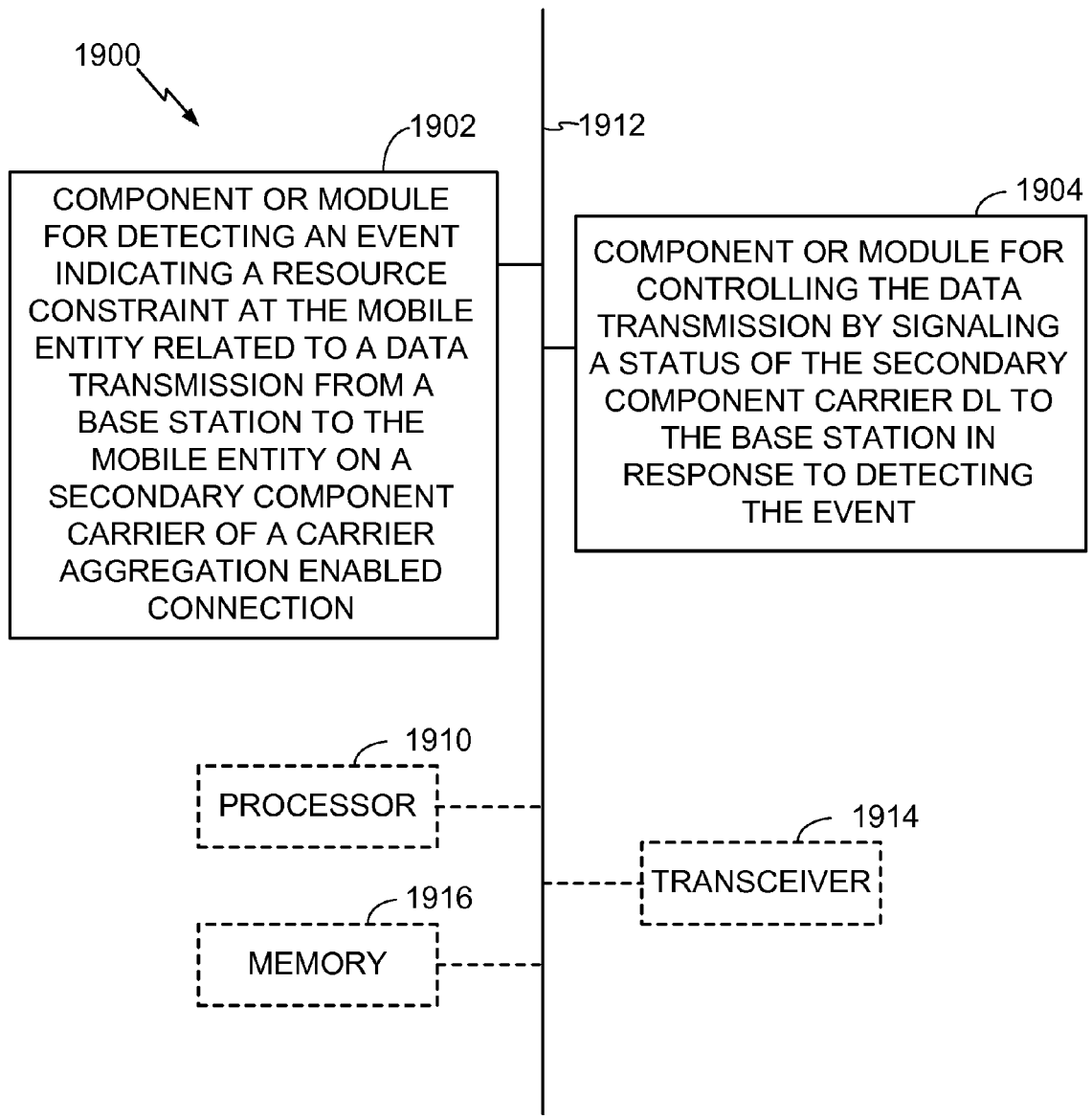
FIG. 19 illustrates an embodiment of an apparatus for downlink data transfer flow control during carrier aggregation, in accordance with the methodologies of FIGS. 12-18.

With reference to FIG. 19, there is provided an exemplary apparatus 1900 that may be configured as a mobile entity or UE in a wireless network, or as a processor or similar device for use within the mobile entity or UE, for controlling a secondary component carrier in a wireless communication network using carrier aggregation. The apparatus 1900 may include functional blocks that can represent functions implemented by a processor, software, or combination thereof (e.g., firmware).

In one embodiment, the apparatus 1900 may include an electrical component or module 1902 for detecting, by a mobile entity, an event indicating a resource constraint at a mobile entity related to a data transmission from a base station to the mobile entity on a secondary component carrier of a carrier aggregation enabled connection. The resource constraint may include one of a CPU processing constraint, a receive chain constraint, a bus bandwidth constraint, a power constraint, an operating temperature constraint, or some other constraint. For example, the electrical component 1902 may include at least one control processor coupled to a transceiver or the like and to a memory with instructions for determining when a resource constraint exists requiring reducing the data rate or shutting down a secondary component carrier. For example, electrical component 1902 may be, or may include, any combination of processor 380, temp sensor 357, measurement module 1108, antenna 352, and/or memory 382. The component 1902 may be, or may include, a means for detecting an event indicating a resource constraint at a mobile entity related to a data transmission from a base station to the mobile entity on a secondary component carrier of a carrier aggregation enabled connection. Said means may include the at least one control processor operating an algorithm. The algorithm may include, for example, detecting a temperature using a signal from a temperature sensor, receiving a 1×RTT paging message, receiving input indicating a request to make a 1×RTT call, measuring a voltage or current of a power source, measuring memory usage, measuring bus bandwidth usage, or measuring CPU usage, and if applicable, comparing a measured quantity (e.g., temperature, voltage, etc.) to a threshold to determine whether the threshold is exceeded.

The apparatus 1900 may include an electrical component 1904 for controlling the data transmission on a SCC by signaling a status of the secondary component carrier to the base station in response to detecting the event. The status may be a quasi-status. For example, the electrical component 1904 may include at least one control processor coupled to a transceiver or the like and to a memory holding instructions for generating a quasi-status signal that does not indicate actual carrier status. For example, electrical component 1904 may be, or may include, any combination of processors 380, 364, 366, antenna 352, memory 382, and/or data source 362. The component 1904 may be, or may include, a means for controlling the data transmission by signaling a status of the secondary component carrier to the base station in response to detecting the event. Said means may include the at least one control processor operating an algorithm. The algorithm may include, for example, signaling a quasi-CQI, quasi-ACK/NACK, quasi-event reporting, quasi-MIMO capability, according to any one or combination of the more detailed techniques described herein, or the additional operations 1300-1800.

The apparatus 1900 may include similar electrical components for performing any or all of the additional operations 1300-1800 described in connection with FIGS. 13-18, which for illustrative simplicity are not shown in FIG. 19.

In related aspects, the apparatus 1900 may optionally include a processor component 1910 having at least one processor, in the case of the apparatus 1900 configured as a mobile entity. The processor 1910, in such case, may be in operative communication with the components 1902-1904 or similar components via a bus 1912 or similar communication coupling. The processor 1910 may effect initiation and scheduling of the processes or functions performed by electrical components 1902-1904. The processor 1910 may encompass the components 1902-1904, in whole or in part. In the alternative, the processor 1910 may be separate from the components 1902-1904, which may include one or more separate processors.

In further related aspects, the apparatus 1900 may include a radio transceiver component 1914. A stand-alone receiver and/or stand-alone transmitter may be used in lieu of or in conjunction with the transceiver 1914. In the alternative, or in addition, the apparatus 1900 may include multiple transceivers or transmitter/receiver pairs, which may be used to transmit and receive on different carriers. The apparatus 1900 may optionally include a component for storing information, such as, for example, a memory device/component 1916. The computer readable medium or the memory component 1916 may be operatively coupled to the other components of the apparatus 1900 via the bus 1912 or the like. The memory component 1916 may be adapted to store computer readable instructions and data for performing the activity of the components 1902-1904, and subcomponents thereof, or the processor 1910, or the additional aspects 1300, 1400, 1500, 1600, 1700, or 1800, or the methods disclosed herein. The memory component 1916 may retain instructions for executing functions associated with the components 1902-1904. While shown as being external to the memory 1916, it is to be understood that the components 1902-1904 can exist within the memory 1916.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Non-transitory computer-readable media includes both computer storage media and temporary memory media including whether or not used to facilitate transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks refer to media holding data that is magnetically encoded, while discs refer to media holding data that is optically encoded. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for controlling a secondary component carrier downlink (DL) in a wireless communication network using carrier aggregation, the method comprising:
   detecting, by a mobile entity, an event indicating a resource constraint at the mobile entity related to a data transmission from a base station to the mobile entity on a secondary component carrier of a carrier aggregation enabled connection; and
   in response to detecting the event, controlling the data transmission by signaling a status of the secondary component carrier DL to the base station.

2. The method of claim 1, wherein the resource constraint is selected from the group consisting of a central processing unit (CPU) processing constraint, a receive chain constraint, a bus bandwidth constraint, a power constraint, or an operating temperature constraint.

3. The method of claim 1, wherein signaling the status comprises signaling a higher number of negative acknowledgements (NACKs) for the data transmission that exceeds a number of NACKs needed to report errors in the data transmission.

4. The method of claim 1, wherein signaling the status comprises signaling no acknowledgements (ACKs) or negative acknowledgements (NACKs) for the data transmission despite receiving signals requesting an ACK/NACK response therein.

5. The method of claim 1, wherein signaling the status comprises signaling a channel quality indicator for the data transmission indicating a lower channel quality than is measured by the mobile entity for the data transmission.

6. The method of claim 5, wherein the channel quality indicator is set to zero.

7. The method of claim 1, wherein signaling the status comprises degrading a quality of the data transmission upstream of a channel measurement module.

8. The method of claim 1, wherein signaling the status comprises degrading event-triggered measurement results provided by the mobile entity to the base station.

9. The method of claim 1, wherein signaling the status comprises indicating a multiple-input multiple-output (MIMO) capability that is less than a MIMO capability of the mobile entity.

10. The method of claim 9, further comprising indicating the capability by at least one of a Precoding Matrix Indicator (PMI) or a Rank Indicator (RI).

11. The method of claim 1, wherein the event comprises receiving a paging message, and the method further comprising freeing up resources for an incoming call by requiring disablement of carrier aggregation on the secondary component carrier.

12. The method of claim 1, wherein the event comprises receiving input indicating a request to make an outgoing call, and the method further comprising freeing up resources for the outgoing call by disabling carrier aggregation on the secondary component carrier.

13. The method of claim 1, further comprising monitoring a data rate of the data transmission.

14. The method of claim 13, wherein the event comprises observing, by the monitoring, a data rate outside of a defined range or set point.

15. The method of claim 14, wherein controlling the data transmission comprises maintaining the data rate within the defined range or set point.

16. An apparatus for controlling a secondary component carrier downlink (DL) in a wireless communication network using carrier aggregation, the apparatus comprising:
   means for detecting an event indicating a resource constraint at a mobile entity related to a data transmission from a base station to the mobile entity on a secondary component carrier of a carrier aggregation enabled connection; and
   means for controlling the data transmission by signaling a status of the secondary component carrier DL to the base station in response to detecting the event.

17. An apparatus for controlling a secondary component carrier downlink (DL) in a wireless communication network using carrier aggregation, comprising:
   at least one processor configured for detecting an event indicating a resource constraint at a mobile entity related to a data transmission from a base station to the mobile entity on a secondary component carrier of a carrier aggregation enabled connection, and controlling the data transmission by signaling a status of the secondary component carrier DL to the base station in response to detecting the event; and
   a memory coupled to the at least one processor for storing data.

18. The apparatus of claim 17, wherein the at least one processor is further configured for selecting the resource constraint from the group consisting of a central processing unit (CPU) processing constraint, a receive chain constraint, a bus bandwidth constraint, a power constraint, or an operating temperature constraint.

19. The apparatus of claim 17, wherein the at least one processor is further configured for signaling the status comprising signaling a higher number of negative acknowledgements (NACKs) for the data transmission that exceeds a number of NACKs needed to report actual errors in the data transmission.

20. The apparatus of claim 17, wherein the at least one processor is further configured for signaling the status comprising signaling no acknowledgements (ACKs) or negative acknowledgements (NACKs) for the data transmission despite receiving signals requesting an ACK/NACK response therein.

21. The apparatus of claim 17, wherein the at least one processor is further configured for signaling the status comprising signaling a channel quality indicator for the data transmission indicating a lower channel quality than is measured by the mobile entity for the data transmission.

22. The apparatus of claim 21, wherein the at least one processor is further configured for signaling the status comprising indicating that the lower channel quality is zero.

23. The apparatus of claim 17, wherein the at least one processor is further configured for signaling the status comprising degrading a quality of the data transmission upstream of a channel measurement module.

24. The apparatus of claim 17, wherein the at least one processor is further configured for signaling the status comprising degrading event-triggered measurement results provided by the mobile entity to the base station.

25. The apparatus of claim 17, wherein the at least one processor is further configured for signaling the status comprising indicating a multiple-input multiple-output (MIMO) capability that is less than a MIMO capability of the mobile entity.

26. The apparatus of claim 25, wherein the at least one processor is further configured for indicating the capability by at least one of a Precoding Matrix Indicator (PMI) or a Rank Indicator (RI).

27. The apparatus of claim 17, wherein the at least one processor is further configured for detecting the event comprising receiving a paging message, and freeing up resources for an incoming call by requiring disablement of carrier aggregation on the secondary component carrier.

28. The apparatus of claim 17, wherein the at least one processor is further configured for detecting the event comprising receiving user input indicating a request to make an outgoing call, and freeing up resources for the outgoing call by requiring disablement of carrier aggregation on the secondary component carrier.

29. The apparatus of claim 17, wherein the at least one processor is further configured for monitoring a data rate of the data transmission.

30. The apparatus of claim 29, wherein the at least one processor is further configured for observing, by the monitoring, the event comprising a data rate outside of a defined range or set point.

31. The apparatus of claim 30, wherein the at least one processor is further configured for controlling the data transmission by maintaining the data rate within the defined range or set point.

32. A non-transitory computer-readable medium for controlling a secondary component carrier downlink (DL) in a wireless communication network using carrier aggregation, comprising:
a computer program having encoded instructions, that when executed by a processor, cause a mobile communications device to detect an event indicating a resource constraint at a mobile entity related to a data transmission from a base station to the mobile entity on a secondary component carrier of a carrier aggregation enabled connection, and to control the data transmission by signaling a status of the secondary component carrier DL to the base station in response to detecting the event.

33. The method of claim 11, wherein the incoming call is a voice call.

34. The method of claim 12, wherein the outgoing call is a voice call.

35. The apparatus of claim 27, wherein the incoming call is a voice call.

36. The apparatus of claim 28, wherein the outgoing call is a voice call.

* * * * *